United States Patent
Yoo et al.

(10) Patent No.: US 10,591,663 B2
(45) Date of Patent: Mar. 17, 2020

(54) LIGHT GUIDE PLATE UNIT, BACKLIGHT UNIT COMPRISING SAME, AND LIQUID CRYSTAL DISPLAY DEVICE

(71) Applicant: LG CHEM, LTD., Seoul (KR)

(72) Inventors: Han Sol Yoo, Daejeon (KR); Dong Ho Ko, Daejeon (KR); Byeong In Ahn, Daejeon (KR); Jae Ho Jung, Daejeon (KR); Hyun Seong Ko, Daejeon (KR); Sin Woo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/082,485

(22) PCT Filed: Apr. 13, 2017

(86) PCT No.: PCT/KR2017/004004
§ 371 (c)(1),
(2) Date: Sep. 5, 2018

(87) PCT Pub. No.: WO2017/179923
PCT Pub. Date: Oct. 19, 2017

(65) Prior Publication Data
US 2019/0094455 A1 Mar. 28, 2019

(30) Foreign Application Priority Data

Apr. 15, 2016 (KR) .......... 10-2016-0046470
Apr. 12, 2017 (KR) .......... 10-2017-0047317

(51) Int. Cl.
*G02B 5/124* (2006.01)
*F21V 8/00* (2006.01)
*G02F 1/1335* (2006.01)
*C09J 11/04* (2006.01)
(Continued)

(52) U.S. Cl.
CPC ............. *G02B 6/0088* (2013.01); *C09J 11/04* (2013.01); *C09J 125/06* (2013.01); *C09J 133/12* (2013.01); *G02B 6/0043* (2013.01); *G02B 6/0055* (2013.01); *G02B 6/0061* (2013.01); *G02F 1/133615* (2013.01); *G02B 6/0065* (2013.01); *G02F 2201/34* (2013.01); *G02F 2202/28* (2013.01)

(58) Field of Classification Search
None
See application file for complete search history.

(56) References Cited

U.S. PATENT DOCUMENTS

| | | |
|---|---|---|
| 2005/0030630 A1 | 2/2005 | Ohnishi et al. |
| 2005/0259194 A1 | 11/2005 | Lee et al. |
| 2008/0089097 A1 | 4/2008 | Kim et al. |

(Continued)

FOREIGN PATENT DOCUMENTS

| | | |
|---|---|---|
| KR | 9-202871 A | 8/1997 |
| KR | 10-2006-0079986 A | 7/2006 |

(Continued)

*Primary Examiner* — Andrew J Coughlin
(74) *Attorney, Agent, or Firm* — Dentons US LLP

(57) ABSTRACT

The present application relates to a light guide plate unit including a reflection plate, an adhesive layer which is provided on the reflection plate and includes a bead, and a light guide plate provided on the adhesive layer, a backlight unit including the light guide plate unit, and a liquid crystal display device including the backlight unit.

12 Claims, 5 Drawing Sheets

(51) Int. Cl.
*C09J 125/06* (2006.01)
*C09J 133/12* (2006.01)

(56) References Cited

U.S. PATENT DOCUMENTS

| | | | | | |
|---|---|---|---|---|---|
| 2008/0130263 | A1* | 6/2008 | Liu | ............... | G02B 6/0055 |
| | | | | | 362/23.05 |
| 2009/0284149 | A1* | 11/2009 | Koshikawa | ......... | C08G 65/007 |
| | | | | | 313/512 |
| 2010/0157623 | A1* | 6/2010 | Tanahashi | ............ | G02B 6/0043 |
| | | | | | 362/606 |
| 2011/0096567 | A1* | 4/2011 | Tiao | .............. | G02B 6/0043 |
| | | | | | 362/607 |
| 2011/0122094 | A1* | 5/2011 | Tsang | ............... | G02B 6/0043 |
| | | | | | 345/175 |
| 2011/0122494 | A1 | 5/2011 | Sherman et al. | | |
| 2011/0163066 | A1* | 7/2011 | Choi | ............... | B32B 37/226 |
| | | | | | 216/36 |
| 2012/0287677 | A1* | 11/2012 | Wheatley | ............ | G02B 6/0051 |
| | | | | | 362/627 |
| 2013/0100704 | A1* | 4/2013 | Kykta | ............... | B05D 5/06 |
| | | | | | 362/627 |
| 2013/0235614 | A1* | 9/2013 | Wolk | ............... | G02B 6/005 |
| | | | | | 362/607 |
| 2015/0189703 | A1* | 7/2015 | Akazawa | ............ | H01L 33/508 |
| | | | | | 313/503 |
| 2016/0238774 | A1* | 8/2016 | Koike | ............... | G02B 6/0043 |
| 2016/0299285 | A1* | 10/2016 | Lee | ............... | G02B 6/0088 |

FOREIGN PATENT DOCUMENTS

| | | |
|---|---|---|
| KR | 10-2008-0032753 A | 4/2008 |
| KR | 10-2011-0028391 A | 3/2011 |
| KR | 10-1070694 B1 | 10/2011 |
| KR | 20120128498 A | 11/2012 |
| KR | 10-1244188 B1 | 3/2013 |
| KR | 10-2013-0084554 A | 7/2013 |
| KR | 10-2014-0022329 A | 2/2014 |
| KR | 10-1392506 B1 | 5/2014 |
| KR | 10-2014-0080743 A | 7/2014 |
| KR | 10-1424737 B1 | 8/2014 |
| KR | 10-1536275 B1 | 7/2015 |
| KR | 10-1537060 B1 | 7/2015 |
| WO | 2012043396 A1 | 4/2012 |

* cited by examiner

[Figure 1]
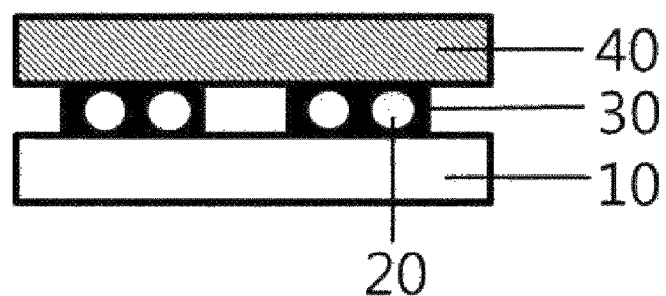
[Figure 2]
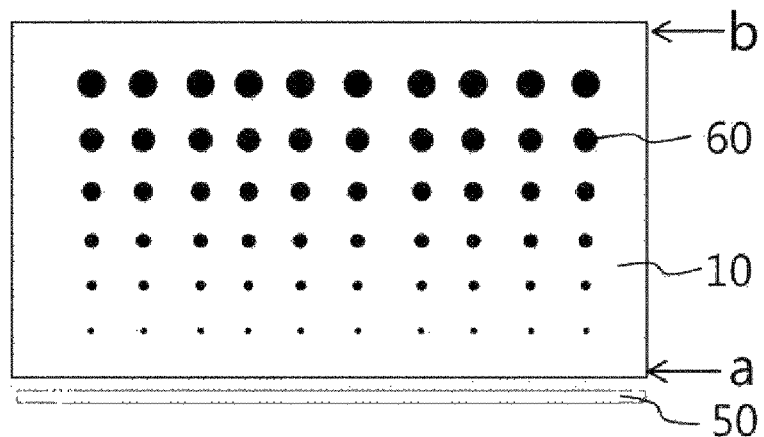

[Figure 3]
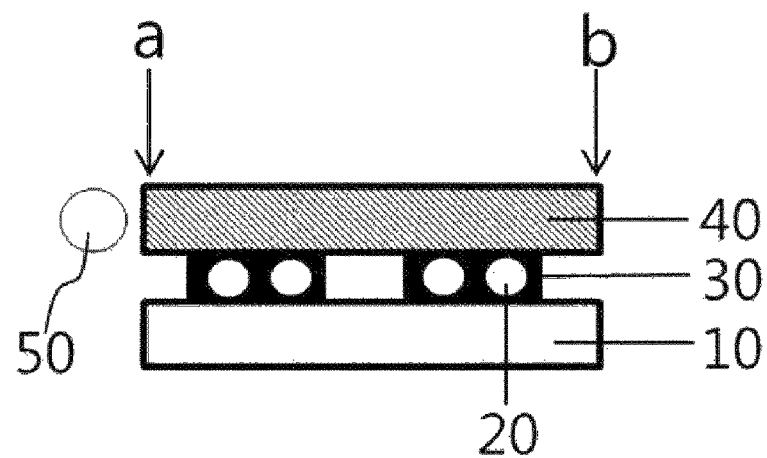
[Figure 4]
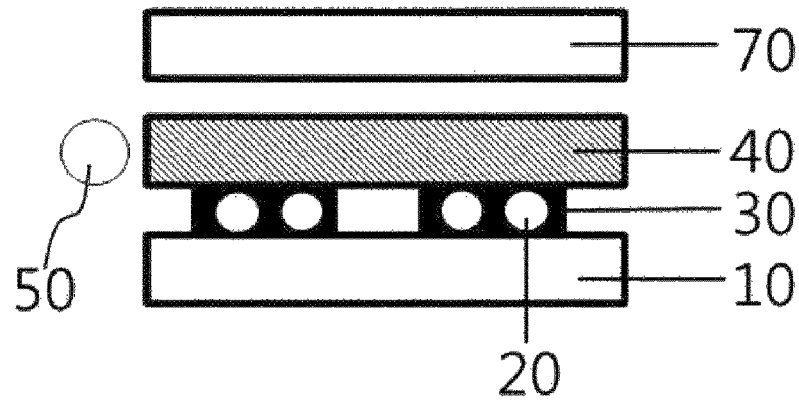

[Figure 5]
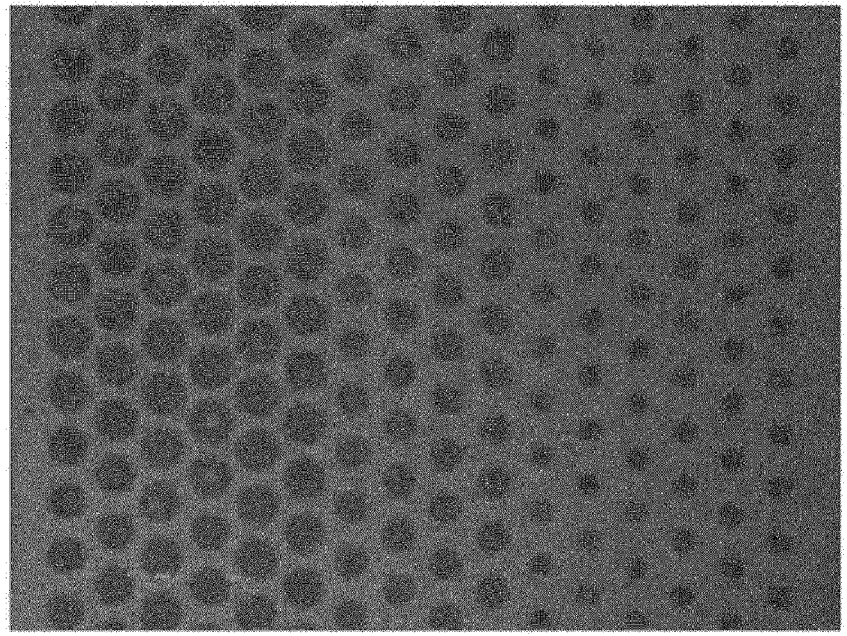
[Figure 6]
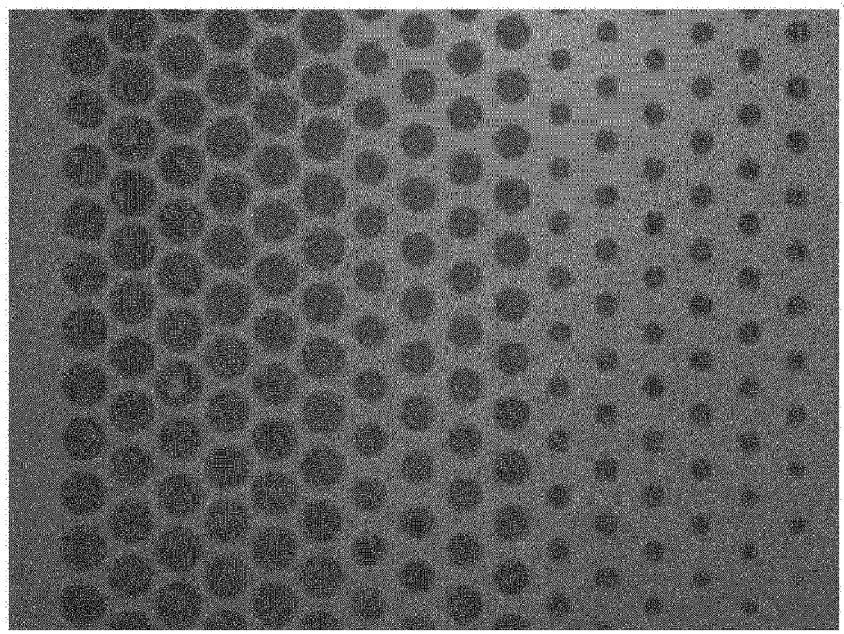

[Figure 7]
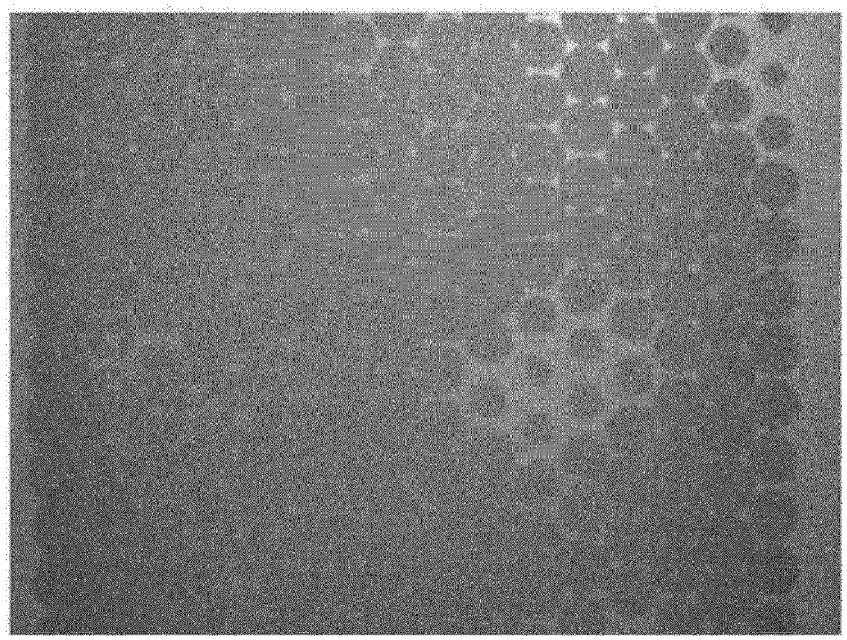
[Figure 8]
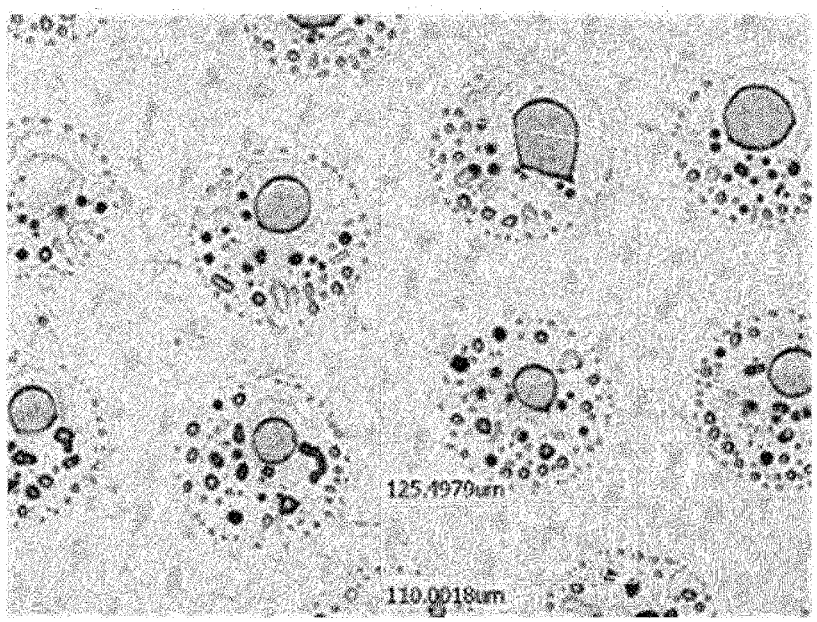

[Figure 9]
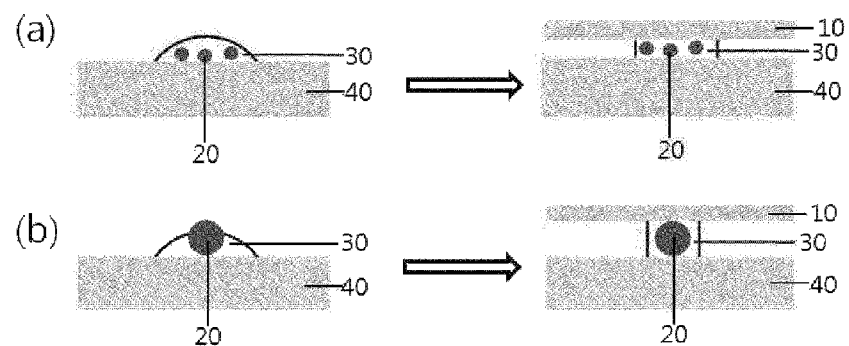

LIGHT GUIDE PLATE UNIT, BACKLIGHT UNIT COMPRISING SAME, AND LIQUID CRYSTAL DISPLAY DEVICE

TECHNICAL FIELD

This application is a National Stage Entry of International Application No. PCT/KR2017/004004, filed on Apr. 13, 2017, and claims the benefit of and priority to Korean Application No. 10-2016-0046470, filed on Apr. 15, 2016, and Korean Application No. 10-2017-0047317, filed on Apr. 12, 2017, all of which are hereby incorporated by reference in their entirety for all purposes as if fully set forth herein.

The present application relates to a light guide plate unit, and a backlight unit and a liquid crystal display device including the same.

BACKGROUND ART

A liquid crystal display device has lower power consumption and may implement high resolution, and may be manufactured to be small and large, so that the liquid crystal display device is getting the spotlight as a video and image display device regardless of a size thereof.

The liquid crystal display device cannot autonomously emit light, so that the liquid crystal display device includes a backlight unit mounted under a liquid crystal panel, in addition to the liquid crystal panel displaying an image.

The backlight unit, which is a device emitting light to a rear surface of the liquid crystal display device, serves to supply light so that image information is generated in the liquid crystal display device. The backlight unit includes a light source generating light and a light guide plate guiding the light generated in the light source toward the liquid crystal panel. A reflection plate is further installed under the light guide plate to provide light supplied to the lower side of the light guide plate to the liquid crystal panel in an upper side through the reflection plate.

In general, in order to manufacture the thin backlight unit, the reflection plate and the light guide plate need to be attached as close as possible. When the reflection plate and the light guide plate are completely attached, there is a problem in that internal total reflection of the light guide plate is broken, so that a layer having a lower refractive index than that of the light guide plate needs to be secured on a lower surface of the light guide plate.

DETAILED DESCRIPTION OF THE INVENTION

Technical Problem

The present application provides a light guide plate unit, which includes a bead in an adhesive layer, so that a thickness between a reflection plate and a light guide plate is uniform, and a backlight unit and a liquid crystal display device including the same.

Technical Solution

An exemplary embodiment of the present application provides a light guide plate unit including a reflection plate, an adhesive layer which is provided on the reflection plate and includes a bead, and a light guide plate provided on the adhesive layer, in which a size of the bead is 5 μm to 30 μm.

Another exemplary embodiment of the present application provides a backlight unit including the light guide plate unit.

Yet another exemplary embodiment of the present application provides a liquid crystal display device including the backlight unit.

Advantageous Effects

According to the exemplary embodiments described in the present application, the adhesive layer includes the bead having the size of 5 μm to 30 μm. A thickness and a width of the adhesive layer are adjusted by the bead, so that there is an effect in that a thickness and adhesive power between the light guide plate and the reflection plate are maintained. Further, an air layer is secured on a lower surface of the light guide plate by the thickness of the adhesive layer, thereby achieving an effect in that total reflection of the light guide plate is possible.

BRIEF DESCRIPTION OF DRAWINGS

FIG. 1 is a diagram illustrating an example of a structure of a light guide plate unit according to an exemplary embodiment of the present application.

FIG. 2 is a diagram illustrating an example of a pattern form of an adhesive layer according to the exemplary embodiment of the present application FIG. 3 is a diagram illustrating an example of a structure of a backlight unit according to the exemplary embodiment of the present application.

FIG. 4 is a diagram illustrating an example of a structure of a liquid crystal display device according to the exemplary embodiment of the present application.

FIGS. 5 and 6 are images representing forms of adhesive layers manufactured in the Examples.

FIGS. 7 and 8 are images representing forms of adhesive layers manufactured in the Comparative Examples.

FIG. 9 is a diagram illustrating an example of a change in the form of the adhesive layer according to the Examples and the Comparative Example of the present specification.

10: Reflection plate
20: Bead
30: Adhesive layer
40: Light guide plate
50: Light source
60: Pattern
70: Liquid crystal panel
a: Light entering portion
b: Reverse light entering portion

BEST MODE

Hereinafter, the present invention will be described in detail.

A light guide plate unit according to an exemplary embodiment of the present specification includes a reflection plate, an adhesive layer which is provided on the reflection plate and includes a bead, and a light guide plate provided on the adhesive layer, and a size of the bead is 5 μm to 30 μm.

FIG. 1 illustrates a structure of a light guide plate unit according to an exemplary embodiment of the present application.

In the exemplary embodiment of the present specification, a size of the bead is 5 μm to 30 μm. The size of the bead means a maximum diameter value of the bead, and the size of the bead is a value measured by using a scanning electron microscope (SEM).

When the size of the bead satisfies the range, a thickness and a width of the adhesive layer are uniform, so that there is an effect in that a space between the light guide plate and the reflection plate is maintained with a predetermined thickness, and adhesive strength is secured. Further, an air layer is secured on a lower surface of the light guide plate by the thickness of the adhesive layer, thereby achieving an effect in that total reflection of the light guide plate is possible.

In the exemplary embodiment of the present specification, the adhesive layer is provided in a pattern form.

In the exemplary embodiment of the present specification, the pattern means a protruding form, and the protruding form of the pattern may be a dot shape.

In the exemplary embodiment of the present specification, two or more patterns of the adhesive layer are disposed while being spaced apart from one another.

In the exemplary embodiment of the present specification, at least one of the pattern at a light entering portion side may be smaller than a pattern at a reverse light entering portion side. For example, the size of the pattern may be increased from the light entering portion side toward the reverse light entering portion side. FIG. 2 is a diagram illustrating an example of a pattern form of the adhesive layer according to the exemplary embodiment of the present application.

When at least one of the pattern at the light entering portion side in the adhesive layer is smaller than the pattern of the reverse light entering portion side, there is an effect in that luminance is uniform. For example, when the size of the pattern is increased from the light entering portion toward the reverse light entering portion, a width of an adhesive at the reverse light entering portion side is larger than a width of an adhesive at the light entering portion side, so that even though the quantity of light sources at the reverse light entering portion side is small, there is an effect in that luminance is uniform.

In the exemplary embodiment of the present specification, the size of the pattern at the light entering portion side is the same as the size of the pattern at the reverse light entering portion side, but the densities of the patterns may be different. For example, the density of the pattern may be increased from the light entering portion side toward the reverse light entering portion side. In the present application, the increase in a density of the pattern means a decrease in a gap between the patterns.

When the density of the pattern is increased from the light entering portion side toward the reverse light entering portion side in the adhesive layer, there is an effect in that luminance is uniform. For example, when a gap between the patterns of the adhesive layer is decreased from the light entering portion side toward the reverse light entering portion side, even though the quantity of light sources at the reverse light entering portion side is small, there is an effect in that luminance is uniform.

In the exemplary embodiment of the present specification, the light entering portion means the side of the light guide plate, to which the light source is irradiated, and the reverse light entering portion means the opposite side of the side of the light guide plate, to which the light source is irradiated. For example, in FIG. 2, a represents the side of the light guide plate, to which the light source is irradiated, that is, the light entering portion, and b represents the opposite side of the side of the light guide plate, to which the light source is irradiated, that is, the reverse light entering portion.

In the exemplary embodiment of the present specification, when the size of the bead is 5 μm to 30 μm, there is an effect in that a shape of the pattern is maintained without overlap of the patterns of the adhesive layer. Accordingly, there is an effect in achieving an effect according to a difference in a size and/or a density of the pattern between the light entering portion and the reverse light entering portion.

In the exemplary embodiment of the present specification, the pattern of the adhesive layer may be formed by a screen printing method, a gravure printing method, or an inkjet printing method. Particularly, the pattern of the adhesive layer may be formed by a screen printing method.

In the exemplary embodiment of the present specification, the adhesive layer includes a matrix resin. The matrix resin may be formed of a thermosetting resin or a photo-curable resin. Particularly, as thermosetting resin or the photo-curable resin, a urethane-based resin, an epoxy resin, an acryl-based resin, a silicon-based resin, a polysiloxane resin, a radically polymerizable compound, and the like may be used. That is, the matrix resin may include at least one of a urethane-based resin, an epoxy resin, an acryl-based resin, a silicon-based resin, a polysiloxane resin, a radically polymerizable compound. Compounds known in the art may be used as the radically polymerizable compound. As necessary, the adhesive layer may further include a cross linking agent and a hardening agent, in addition to thermosetting resin or a photo-curable resin. Particularly, isocyanate and radical initiators may be used as the cross linking agent and the hardening agent, but the cross linking agent and the hardening agent are not limited thereto.

In the exemplary embodiment of the present specification, the adhesive layer may additionally include light scattering particles. Particularly, the light scattering particle may be $TiO_2$ or $SiO_2$.

In the exemplary embodiment of the present specification, a composition of the adhesive layer may include a bead and a matrix resin and may be a solventless type. Particularly, the matrix resin included in the adhesive layer may be a solventless type.

In the exemplary embodiment of the present specification, the solventless type means a type including no solvent.

In the exemplary embodiment of the present specification, the matrix resin is the solventless type, so that a process of drying a solvent is not included, thereby achieving an effect in that process cost is decreased compared to a process including a solvent. Further, the matrix resin of the solventless type is used, so that there are effects in that a change in a size of a dot due to evaporation of a solvent is prevented, a screen mesh is prevented from being blocked, and a printing property is improved.

In the exemplary embodiment of the present specification, a thickness of the adhesive layer is 5 μm to 30 μm. The thickness of the adhesive layer means a value obtained by measuring a thickness of a space between a surface of the reflection layer and the highest portion of the adhesive layer, and the size of the bead may be measured by using a scanning electron microscope (SEM).

When the thickness of the adhesive layer satisfies the range, there is an effect in that a thickness between the light guide plate and the reflection plate is uniform. That is, there is an effect in that a thickness between the light guide plate and the reflection plate is maintained with the range of 5 μm to 30 μm.

In the exemplary embodiment of the present specification, the bead is an organic bead. Particularly, the bead includes an organic bead including at least one of polymethylmethaacrylate (PMMA), polystyrene (PS), and a copolymer thereof. The content of bead is 0.5 phr to 5 phrs in comparison with the matrix resin. When the content of bead is less than 0.5 phr, there is difficulty in uniformly maintaining a thickness between the light guide plate and the reflection plate, and when the content of bead is larger than 5 phr, there is a problem in that adhesive strength of the adhesive layer is degraded.

In the exemplary embodiment of the present specification, a size of the pattern is 50 μm to 1,000 μm. Particularly, a size of the pattern is 50 μm to 800 μm. More particularly, a size of the pattern is 50 μm to 700 μm. A size of the pattern is a value obtained by measuring the portion of the pattern having the largest diameter, and the size of the pattern may be measured through a high magnification lens.

When the size of the pattern satisfies the range, there is an effect in that luminance in a surface direction is uniform. The size of the pattern is a value obtained by measuring the portion of the pattern having the largest diameter.

In the exemplary embodiment of the present specification, a gap between the patterns is 100 μm to 3,000 μm. Particularly, a gap between the patterns is 100 μm to 2,500 μm. More particularly, a gap between the patterns is 100 μm to 2,000 μm. A gap between the patterns is a value obtained by measuring a distance between the center portions of the respective patterns, and the gap between the patterns may be measured through a high magnification lens.

When the gap between the patterns satisfies the range, there is an effect in that the form of each pattern is hidden after passing through a light diffusion film and a prism sheet, and the like and is smoothly observed. The gap between the pattern is a value obtained by measuring a distance between the center portions of the respective patterns.

In the exemplary embodiment of the present specification, the reflection plate may use a material used in the art, and for example, inorganic fillers, such as a calcium oxide or a titanium dioxide ($TiO_2$), or has an improved reflection characteristic by pores formed inside a base material, such as polyethyleneterephthalate (PET), may be used. A thickness of the reflection plate is 50 μm to 500 μm.

In the exemplary embodiment of the present specification, the light guide plate may use a material used in the art, and for example, a glass light guide plate may be used.

In the exemplary embodiment of the present specification, the light guide plate unit may be usefully applied to a backlight unit.

In the backlight unit, a light source may be positioned on one surface of the light guide plate in the light guide plate unit. Particularly, the light source may be a side-chain light source. FIG. 3 illustrates a structure of the backlight unit according to the exemplary embodiment of the present application.

The aforementioned backlight unit according to the exemplary embodiment of the present specification is applied to a liquid crystal display device. As long as the liquid crystal display device includes the aforementioned backlight unit as a constituent element, the liquid crystal display device is not particularly limited. For example, the liquid crystal display device may include a liquid crystal panel and the backlight unit. Particularly, in the liquid crystal display device, the liquid crystal panel may be provided on one surface of the light guide plate, in which the adhesive layer is not provided, in the backlight unit. FIG. 4 illustrates an example of the structure of the liquid crystal display device. However, the liquid crystal display device is not limited thereto, as necessary, a polarizing plate or an additional film, for example, a phase difference film, a light collecting sheet, and a diffusion sheet, may be additionally provided between the liquid crystal panel and the backlight unit.

MODE FOR CARRYING OUT THE INVENTION

Hereinafter, the present specification will be described in detail with reference to the Examples. However, the Examples according to the present specification may be modified into various forms, and the scope of the present specification is not interpreted as being limited to the Examples described in detail below. The Examples of the present specification are provided for more completely explaining the present specification to those skilled in the art.

Example 1

A composition for forming an adhesive layer was prepared by using a UV adhesive as a matrix resin, PMMA as a bead, and $TiO_2$ as light scattering particles, and the composition was screen-printed on a light guide plate.

Particularly, 1 phr of PMMA particles having a size of 10 μm in comparison with a UV adhesive and 1 phr of $TiO_2$ at a level of 200 nm were mixed and screen-printed on a light guide plate.

Example 2

1 phr of PMMA particles having a size of 5 μm in comparison with a UV adhesive and 1 phr of $TiO_2$ as light scattering particles at a level of 200 nm were mixed and screen-printed on a light guide plate.

Example 3

1 phr of PMMA particles having a size of 5 μm in comparison with a UV adhesive was screen-printed on a light guide plate.

Example 4

5 phr of PMMA particles having a size of 5 μm in comparison with a UV adhesive and 1 phr of $TiO_2$ at a level of 200 nm were mixed and screen-printed on a light guide plate.

Example 5

3 phr of PS particles having a size of 7 μm in comparison with a UV adhesive and 1 phr of $TiO_2$ at a level of 200 nm were mixed and screen-printed on a light guide plate.

Example 6

0.5 phr of PMMA particles having a size of 15 μm in comparison with a UV adhesive and 1 phr of $TiO_2$ at a level of 200 nm were mixed and screen-printed on a light guide plate.

Example 7

0.5 phr of PMMA particles having a size of 28 μm in comparison with a UV adhesive and 1 phr of $TiO_2$ at a level of 200 nm were mixed and screen-printed on a light guide plate.

Comparative Example 1

A light guide plate unit was manufactured by the same method as that of Example 1 except that a UV adhesive did not include a bead.

Comparative Example 2

2 phr of PS particles having a size of 3 µm in comparison with a UV adhesive and 1 phr of TiO$_2$ at a level of 200 nm were mixed and screen-printed on a light guide plate.

Comparative Example 3

0.5 phr of PMMA particles having a size of 40 µm in comparison with a UV adhesive and 1 phr of TiO$_2$ at a level of 200 nm were mixed and screen-printed on a light guide plate.

Pattern shapes and the results of the experiment of adhesive power of Examples 1 to 7 and Comparative Examples 1 to 3 are represented in Table 1 below.

Adhesive power of the adhesive layer was measured by a method corrected in ASTM D3330. Adhesive power was measured through 180° peel test, and a peel speed was set to 500 mm/min for the measurement. In Table 1 below, the case where the adhesive portion was ruptured after the measurement as the result of the experiment of the adhesive power is indicated "0", and the case where the adhesive portion was not ruptured is indicated "X".

TABLE 1

|  | Organic bead | | TiO$_2$ 200 nm | Pattern shape | Adhesive power | Thickness of adhesive layer |
|---|---|---|---|---|---|---|
|  | Type | Size (µm) | Content (phr) | Content (phr) | | | |
| Example 1 | PMMA | 10 | 1 | 1 | ○ | ○ | 10 |
| Example 2 | PMMA | 5 | 1 | 1 | ○ | ○ | 5 |
| Example 3 | PMMA | 5 | 1 | 0 | ○ | ○ | 5 |
| Example 4 | PMMA | 5 | 5 | 1 | ○ | ○ | 5 |
| Example 5 | PS | 7 | 3 | 1 | ○ | ○ | 7 |
| Example 6 | PMMA | 15 | 0.5 | 1 | ○ | ○ | 15 |
| Example 7 | PMMA | 28 | 0.5 | 1 | ○ | ○ | 28 |
| Comparative Example 1 | — | — | — | 1 | X | ○ | 1~5 |
| Comparative Example 2 | PS | 3 | 2 | 1 | X | ○ | 3 |
| Comparative Example 3 | PMMA | 40 | 0.5 | 1 | X | X | 40 |

As represented in Table 1, it can be seen that in Examples 1 to 7, in which the beads having the sizes of 5 µm to 30 µm are included, the pattern shapes are uniform and adhesive power is exhibited, but in Comparative Examples 1 to 3, in which the bead is not included, or the size of the bead deviates from 5 µm to 30, the patterns overlap in a partial area and thus the pattern is not uniform.

The forms of the adhesive layers of Examples 1 and 2, and Comparative Example 1 were measured through a high magnification lens (Micro-UV Company, EXCEL 4220) and are represented in FIGS. 5, 6, and 7, respectively.

It can be seen that in the adhesive layers of FIGS. 5 and 6, the bead is added, so that the pattern is not pressed by a thickness or more of the bead, and maintains a predetermined thickness. In the meantime, it can be seen that in the adhesive layer of FIG. 7, the adhesive is widely spread, so that the size of the pattern is increased and the patterns overlap in a partial area. As the result of the measurement by using a high magnification lens, Examples 3 to 7 represent the similar forms as those of Examples 1 and 2.

The form of the adhesive layer of Comparative Example 3 was measured by using a high magnification lens (KEYENCE Company, VK-X Series) and is represented in FIG. 8. In FIG. 8, a dotted line represents a pattern during the printing of the adhesive, and an internal circle (solid line) represents a region, in which the adhesive is left, after the reflection plate and the light guide plate are bonded. In FIG. 8, it can be seen that the size of the pattern is decreased after the reflection plate and the light guide plate are bonded. This is a phenomenon observed because the bead having the large size is used, so that the adhesive layer cannot be pressed and the matrix resin cannot be spread in the case of Comparative Example 3, unlike Examples. As a result, the size of the pattern is decreased, so that an adhesive area is decreased and adhesive power is decreased.

FIG. 9 is a diagram illustrating an example of a change in the form of the adhesive layer according to Examples 1 to 7 and Comparative Example 3 of the present specification. FIG. 9A is a diagram illustrating an example of a change in the form of the adhesive layer according to Examples 1 to 7, and it can be seen that when the adhesive layer including the organic bead having the size of 5 µm to 30 µm is applied on the light guide plate in a form of a pattern and the reflection plate is laminated, the adhesive layer is maintained without a change in the size of the pattern. On the other hand, FIG. 9B is a diagram illustrating an example of a change in the form of the adhesive layer according to Comparative Example 3, and it can be seen that when the adhesive layer including the organic bead having the large size is applied on the light guide plate in a form of a pattern and the reflection plate is laminated, the adhesive layer cannot be pressed and the matrix resin cannot be spread due to the size of the bead, so that the size of the pattern and the adhesive area are decreased.

As described above, in the light guide plate unit according to the exemplary embodiment of the present invention and the backlight unit including the same, the adhesive layer including the organic bead having the size of 5 µm to 30 µm is included in the light guide plate unit, so that there are effects in that adhesive power between the light guide plate and the reflection plate is maintained and a thickness of the adhesive layer is uniform. Accordingly, there is an effect in that luminance in a surface direction is uniform.

The invention claimed is:

1. A light guide plate unit, comprising:
   a reflection plate;
   an adhesive layer which is provided on the reflection plate and includes a bead and a matrix resin, wherein the adhesive layer is provided in the form of two or more patterns; and
   a light guide plate provided on the adhesive layer,
   wherein the content of the bead is 0.5 phr to 5 phr in comparison with the matrix resin,
   wherein the bead has a size of 5 µm to 30 µm and the adhesive layer comprises light scattering particles selected from TiO$_2$ and SiO$_2$.

2. The light guide plate unit of claim 1, wherein the bead is an organic bead including at least one of polymethylmethacrylate, polystyrene, and a copolymer thereof.

3. The light guide plate unit of claim 1, wherein at least one pattern is a dot shape.

4. The light guide plate of claim 1, wherein the two or more patterns have a size of 50 μm to 1,000 μm.

5. The light guide plate unit of claim 1, wherein a gap between the patterns is 100 μm to 3,000 μm.

6. The light guide plate unit of claim 1, wherein the adhesive layer has a thickness of 5 μm to 30 μm.

7. The light guide plate unit of claim 1, wherein the adhesive layer includes a matrix resin.

8. The light guide plate unit of claim 7, wherein the matrix resin includes at least one of a urethane-based resin, an epoxy resin, an acryl-based resin, a silicon-based resin, a polysiloxane resin, and a radically polymerizable compound.

9. The light guide plate unit of claim 7, wherein a composition forming the adhesive layer includes a bead and a matrix resin, and is a solventless type.

10. A backlight unit comprising the light guide plate unit of claim 1.

11. A liquid crystal display device including the backlight unit of claim 10.

12. The light guide plate unit of claim 1, wherein the two or more patterns have different densities.

* * * * *